(12) United States Patent
Hamaoka et al.

(10) Patent No.: US 6,356,073 B1
(45) Date of Patent: Mar. 12, 2002

(54) ANGULAR POSITION DETECTING APPARATUS CONFIGURED FOR CONCENTRATING MAGNETIC FLUX INTO DETECTING PORTION

(75) Inventors: Takashi Hamaoka; Takamitsu Kubota, both of Kariya; Yoshiyuki Kono, Obu, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/598,986

(22) Filed: Jun. 19, 2000

(30) Foreign Application Priority Data

Jun. 28, 1999 (JP) .......................................... 11-182454
Oct. 21, 1999 (JP) .......................................... 11-298997
Feb. 28, 2000 (JP) .......................................... 12-055923

(51) Int. Cl.$^7$ .............................. G01B 7/14; G01B 7/30
(52) U.S. Cl. .............................. 324/207.2; 324/207.25; 324/207.22
(58) Field of Search ........................ 324/207.2, 207.12, 324/207.25, 207.21, 251, 252, 173, 174; 338/32 H, 32 R

(56) References Cited

U.S. PATENT DOCUMENTS 5,528,139 A   6/1996  Oudet et al.
5,789,917 A * 8/1998  Oudet et al. ............ 324/207.2
5,861,745 A   1/1999  Herden
6,043,645 A * 3/2000  Oudet et al. ............ 324/207.2

FOREIGN PATENT DOCUMENTS

DE   196 34 281 A1   2/1998
DE   196 34 282 A1   2/1998

* cited by examiner

Primary Examiner—Jay Patidar
Assistant Examiner—Subhash Zaveri
(74) Attorney, Agent, or Firm—Nixon & Vanderhye PC

(57) ABSTRACT

A stator core has a detecting portion located on a center of a gap penetrating the stator core in a diametric direction and a Hall IC arranged in the detecting portion. Large gap portions each having a distance G3 wider than a distance G2 of the detecting portion are formed on both sides of the detecting portion. Therefore, a magnetic flux passing through the stator core is concentrated into the detecting portion, and the magnetic flux density passing through the Hall IC is increased. As a result, an output of the Hall IC is increased. The large gap portion is formed to narrower a distance G4 on an outer side of the stator core, and the distance G4 is wider than an air gap G1 between the permanent magnet and the stator core.

19 Claims, 11 Drawing Sheets

ANGULAR POSITION DETECTING APPARATUS CONFIGURED FOR CONCENTRATING MAGNETIC FLUX INTO DETECTING PORTION

CROSS REFERENCE TO RELATED APPLICATION

This application is based upon Japanese Patent Application No. Hei. 11-182454 filed on Jun. 28, 1999, No. Hei. 11-298997 filed on Oct. 21, 1999, and No. 2000-55923 filed on Feb. 28, 2000, the contents of which are incorporated herein by reference.

BACKGROUND OF THE INVENTION

1. Field of the Invention

The present invention relates to an angular position detecting apparatus, and in particular to an angular position detecting apparatus having an improved stator core arrangement.

2. Related Art

The angular position detecting apparatus having a rotor supporting a magnet and a stator supporting a detecting element is disclosed in JP-B2-2842482, JP-A-8-35809, WO 98/08060, U.S. Pat. No. 5,861,745 and DE 19634281 A1. For example, the angular position detecting apparatus detects an opening degree of a throttle valve (an opening degree of a throttle) of an internal combustion engine.

SUMMARY OF THE INVENTION

FIG. 22 shows a prior work by the inventor. As shown in FIG. 22, a stator core 12 is concentrically arranged at an inner side of a cylindrical rotor core 11, which integrally rotates with a throttle valve (not-shown). Two permanent magnets 13 having a circular arc shape are fixed to the inner side of the rotor core 11 so as to confront each other and sandwich the stator core 12. Each of the permanent magnets 13 is radially magnetized so that all of lines of magnetic force in the permanent magnets 13 are set to a radial direction. Incidentally, a gap portion 14 having a constant width for detecting a magnetic flux is formed at a center portion of the stator core 12 so as to open along a diametric direction. A detecting element 15 such as a Hall IC is provided in the gap portion 14. According to this structure, since a magnetic flux density passing through the gap portion 14 of the stator 12 (magnetic flux density passing through the detecting element 15) changes in proportion to the angular position of the rotor core 11, and since output of the detecting element 15 changes in proportion to the magnetic flux density, the angular position of the rotor core 11 (angular position of the throttle valve) is detected based on the output of the detecting element 15. As shown in FIG. 22, the gap portion 14 has a constant width and the detecting element 15 occupies only a part of the gap portion 14. Therefore, the detecting element 15 only detects a part of the magnetic flux which passes through the gap portion 14. Therefore, a powerful or large magnet, or a signal processing circuit having a high gain amplifier is required to achieve a sufficient signal indicating an output of the detecting element 15.

This invention has been conceived in view of the background thus far described and its first object is to provide an improved angular position detecting apparatus.

Its second object is to provide an improved angular position detecting apparatus out putting a sufficient level of signal from a detecting element.

Its third object is to provide an improved angular position detecting apparatus having a stator core for concentrating a magnetic flux into the detecting element.

Its fourth object is to provide a stator core arrangement for concentrating the magnetic flux into the detecting element without decreasing a detecting range.

According to one aspect of the present invention, a gap portion formed in a stator has a detecting portion which is a gap having a small distance and a large gap portion having a distance wider than the detecting portion for concentrating the magnetic flux into the detecting portion. Therefore, a detecting element arranged in the gap portion detects a concentrated magnetic flux and outputs a sufficient signal.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

[First Embodiment]

Figure 1:
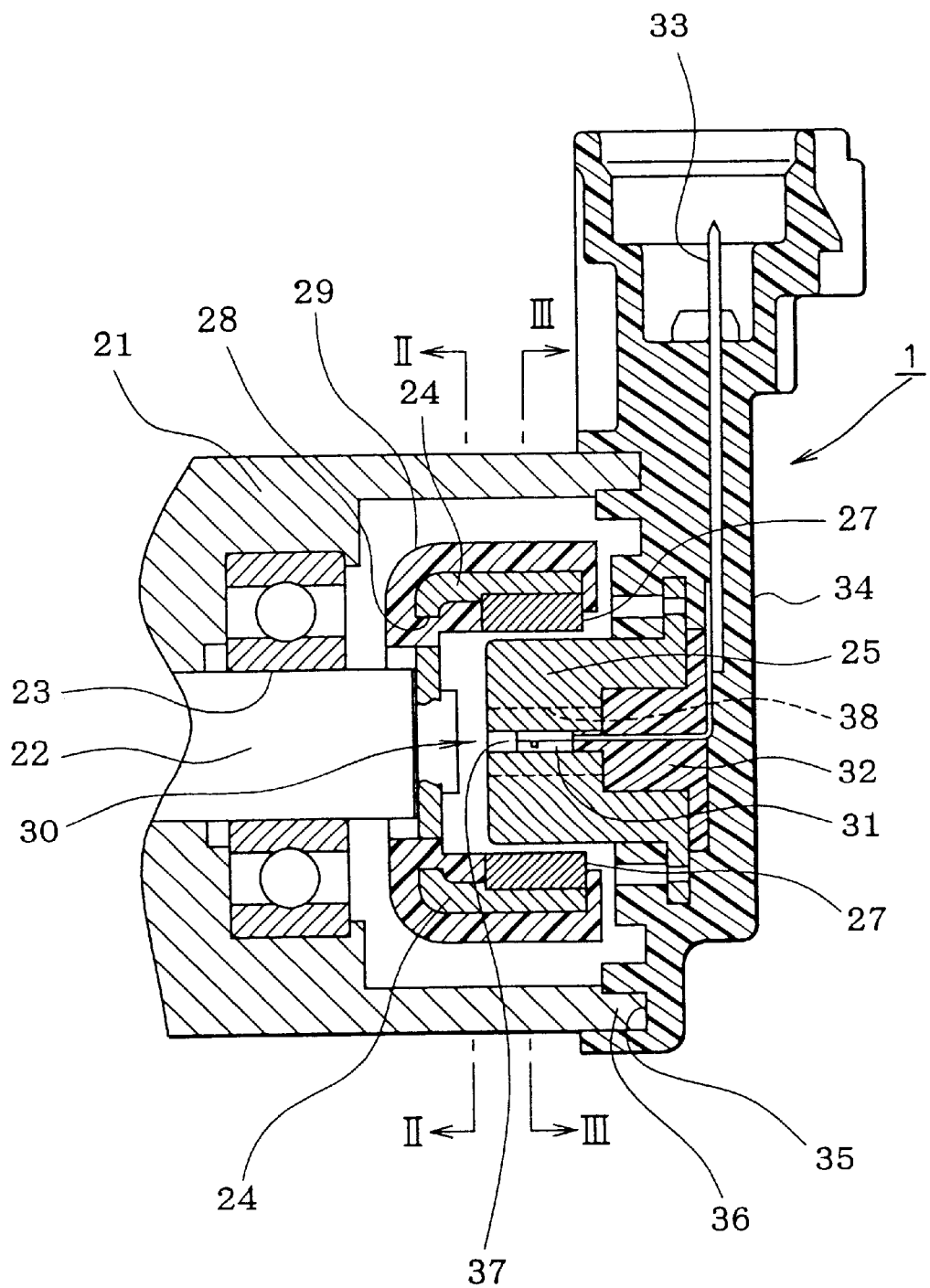
FIG. 1 is a vertical sectional view of an angular position detecting apparatus according to a first embodiment of the present invention.

Hereinafter, a first embodiment of the present invention will be explained with reference to FIGS. 1 to 5. At first, a structure of an angular position detecting apparatus 1 will be explained with reference to FIGS. 1 to 3. A rotation shaft 22 of a detection object such as a shaft of a throttle valve is inserted and rotatably supported to a main housing 21 of the apparatus 1 via a bearing 23. The rotation shaft 22 is made of a magnetic material such as iron. A rotor core 24 having a cylindrical cap shape is fixed to a tip (right side end) of the rotation shaft 22 by being swaged. A stator core 25 is concentrically arranged inner side of the rotor core 24. Each of the rotor core 24 and the stator core 25 is made of a magnetic material such as iron.

Figure 2:
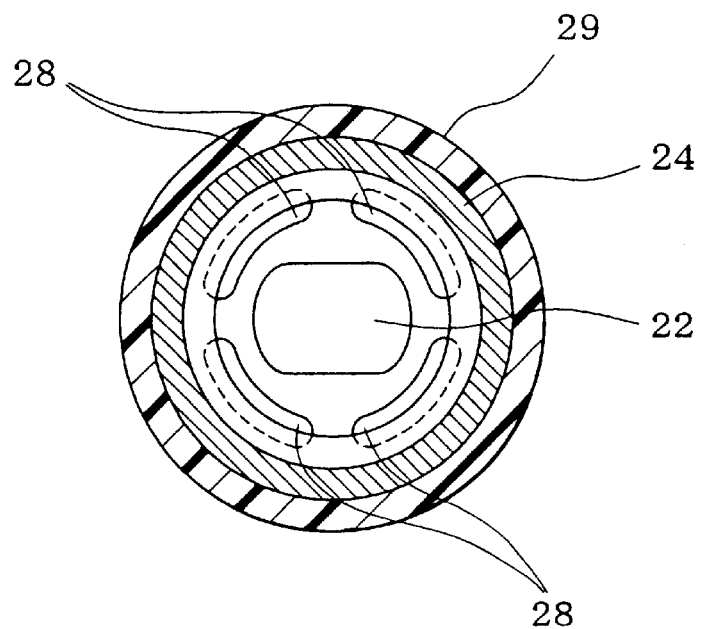
FIG. 2 is a sectional view of the first embodiment, taken along a line II—II in FIG. 1.

A permanent magnet 27 having a cylindrical cup shape is fixed to an inner side of the rotor core 24 by adhering, molding with resin or the like. The permanent magnet 27 confronts with the stator core 25 toward an axial direction (shaft direction). An air gap G1 is provided between an inner surface of the permanent magnet 27 and an outer surface of the stator core 25. The permanent magnet 27 is magnetized in a radial direction to provide a magnetic flux in a radial direction. The permanent magnet 27 has an upper section where a north pole is appeared on an inner side and a south pole is appeared on an outer side. The permanent magnet also has a lower section where a north pole is appeared on an outer side and a south pole is appeared on an inner side. The permanent magnet 27 may be separated into the upper section and the lower section. The permanent magnet 27 may be provided by a plurality of magnets. The permanent magnet 27 may be magnetized so as to provide parallel magnetic flux therebetween. As shown in FIG. 2, a side portion of the rotor core 24 has a plurality of through holes 28 located to surround the rotation shaft 22 for preventing short-circuit of the magnetic flux. An outer surface of the rotor core 24 has a molded resin 29.

Figure 3:
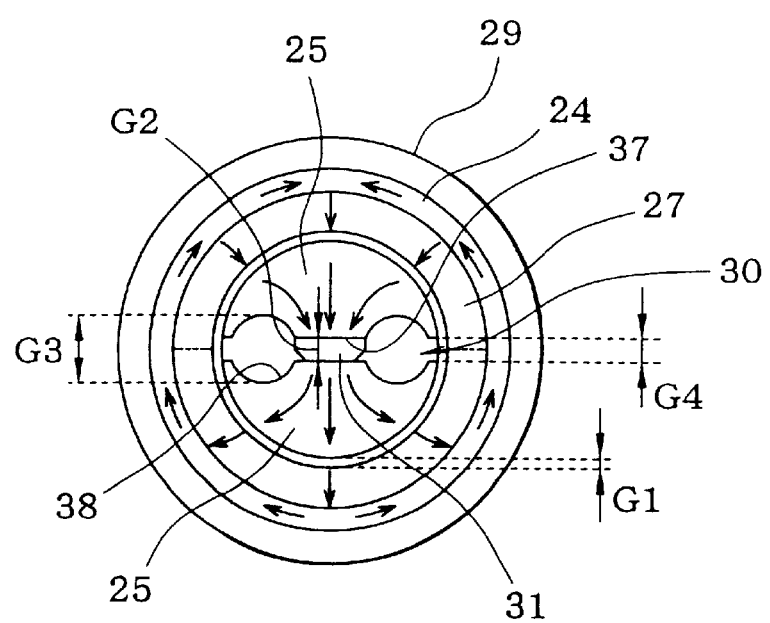
FIG. 3 is a sectional view of the first embodiment, taken along a line III—III in FIG. 1.

FIG. 3 shows that the stator core 25 is divided into two parts to form a gap 30 as a magnetic flux detection gap portion. A resin spacer 32 maintains a width of the gap 30. A detecting portion 37 for detecting the magnetic flux having a distance G2 for providing a parallel magnetic field is formed at a center portion of the gap 30. The dimension of the detecting portion 37 is set not smaller than a Hall IC to be disposed in the detecting portion 37. In this embodiment, the length of the detecting portion 37 is set substantially the same as the width of the hall IC 31 to achieve the maximum magnetic flux.

A pair of large gap portions 38 having a distance G3 larger than the distance G2 is formed on both sides of the detecting portion 37. A pair of circular depressions formed between the detecting portion 37 and an outer surface of the stator core 25 provides each of the gap portions 38. Therefore, the stator core 25 has a gap having distance G4 larger than the distance G1 and smaller than the distance G3.

A Hall IC 31 is arranged in the gap portion 30. The Hall IC 31 is an IC, in which a Hall element (detecting element) is integrally formed with an amplifying circuit, and outputs a voltage signal in accordance with a c flux density going through the gap portion 30 (a magnetic flux density passing through the Hall IC 31). The Hall IC 31 may include a function for electrically trimming an output gain adjustment, an offset adjustment, and a correction of a thermal characteristic, or may include a self-diagnosis function for disconnection or short-circuit. A resin spacer 32 positions the Hall IC 31. A terminal of the Hall IC 31 is connected to a connector pin 33 through inside of the spacer 32 by using welding or the like. A connector housing 34 is formed by resin-molding the connector pin 33, the stator core 25, the spacer 32, and soon. A depression portion 35 having a ring shape is formed at a left side of the connector housing 34 concentrically with the stator core 25. An accuracy of the sameness of the axis between the rotor core 24 and the stator core 25 are secured by inserting a right end portion 36 of the main housing 21 into the ring depression portion 35 with pressure and by fixing them by an adhesives or the like.

Figure 4:
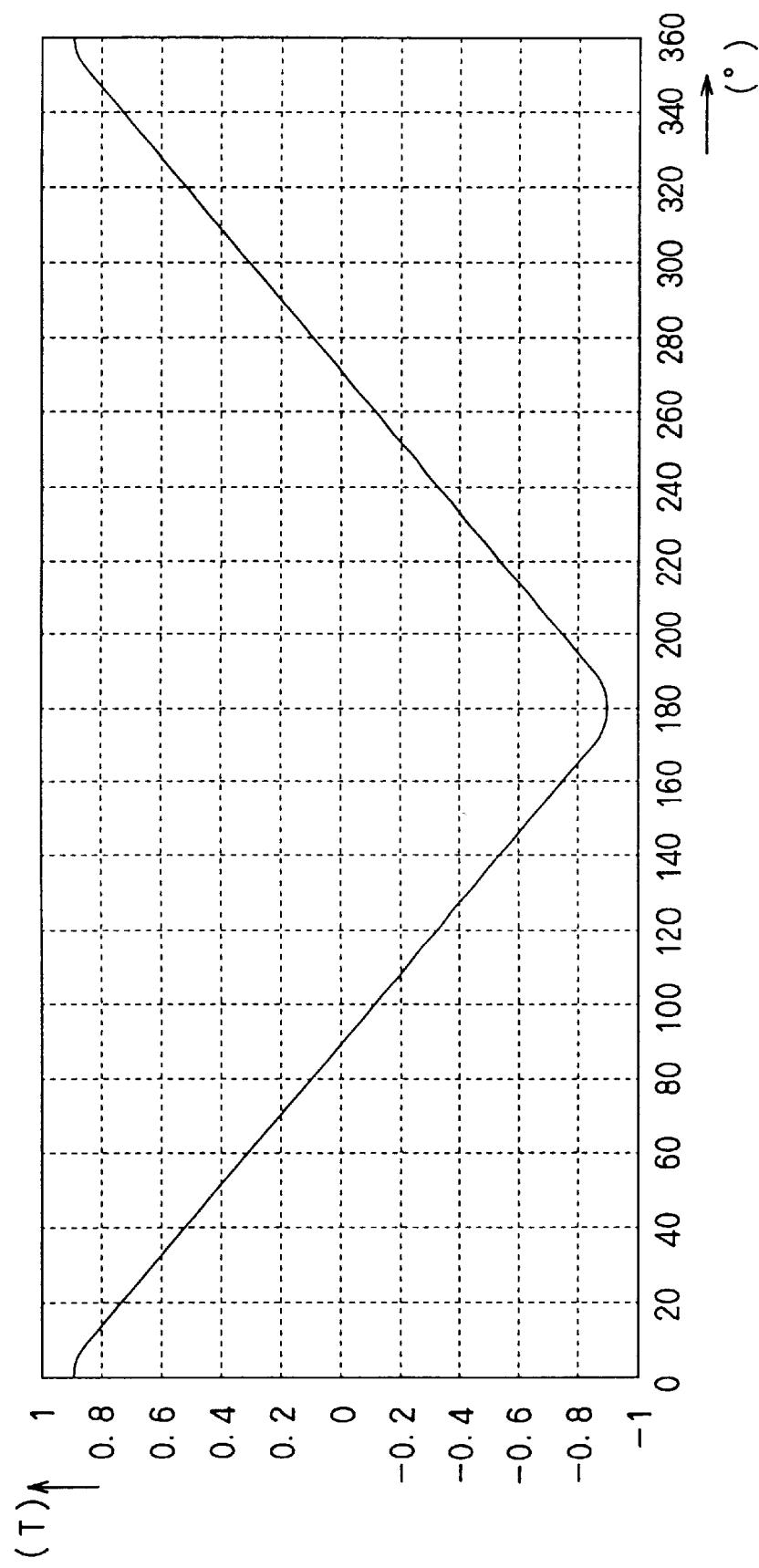
FIG. 4 is a graph showing a magnetic flux density at a detecting portion with respect to a rotating angle of the first embodiment.
Figure 5:
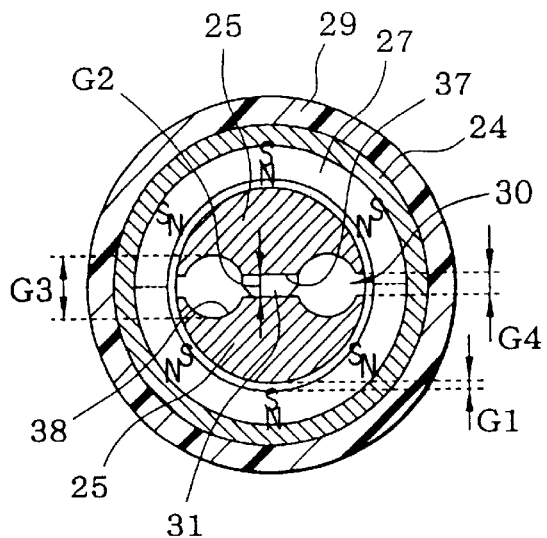
FIGS. 5 through 10 are sectional views of the first embodiment through a sixth embodiment of the present invention.
Figure 6:
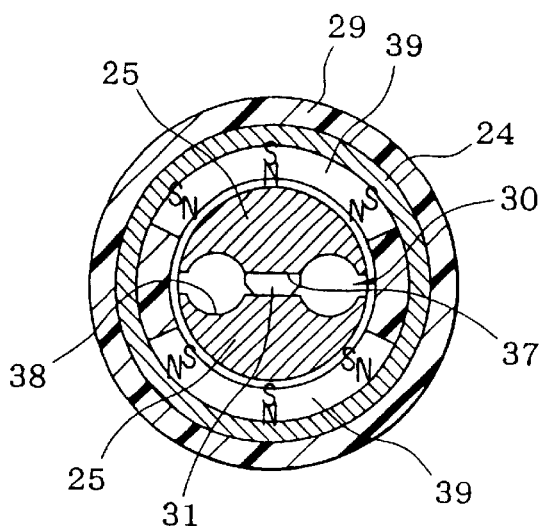

FIG. 3 shows a relative position where a rotating angle of the rotor core 24 is 0 degree, a magnetic circuit is formed in the following path: an upper portion of the permanent magnet 27→an upper portion of the stator core 25→the detecting portion 37→a lower portion of the stator core 25→a lower portion of the permanent magnet 27→the rotor core 24→the upper portion of the permanent magnet 27. The magnetic flux runs from the upper side to the lower side. Hereinafter, this direction is referred to as a positive direction. When the rotor core 24 rotates in accordance with a rotation of the throttle valve, the magnetic poles of the permanent magnet 27 move to the opposite pieces of the stator core 25. Therefore, the magnetic flux in the positive direction is decreased as the rotating position of the permanent magnet 27. As shown in FIG. 4, the magnetic flux is decreased as an increment of the rotating angle in a range from 0 to 180 degree. The magnetic flux is increased as an increment of the rotating angle in a range from 180 to 360 degree. As a result, the magnetic flux going through the detecting portion 37 (the magnetic flux passing through the Hall IC 31) changes in proportion to the rotating angle of the rotor core 24, and an output of the Hall IC 31 changes in proportion to the magnetic flux density. A control circuit (not-shown) detects the angular position of the rotor core 24 based on the output of the Hall IC 31.

According to the first embodiment described in the above, since the large gap portions 38 are formed on both sides of the detecting portion 37, the magnetic flux is concentrated into the detecting portion 37. Therefore, the output of the Hall element in the Hall IC is increased. In this embodiment, the output of the Hall IC is increased 30%. As a result, an amplifying ratio of the output of the Hall element can be lowered.

In this embodiment, the large gap portions 38 guide the magnetic flux to the detecting portion 37. Additionally, since the large gap portions 38 are located on both sides of the detecting portion 37, the magnetic flux evenly concentrated from both sides of the detecting portion 37. The stator core 25 can maintain sufficient outer surface area to receive the magnetic flux from the permanent magnet 27 even the large gap portions 38 are disposed.

As described above, since components of the positive direction and the negative direction are the same, the magnetic flux is 0 when the rotating angle is 90 degree. Here, if the gap G4 is set smaller than the air gap G1, since the magnetic flux changing rate is decreased in a range nearby 90 degree, a linearity of the magnetic flux is deteriorated. Therefore,in this embodiment, the gap G4 is set larger than the air gap G1 to achieve the linearity of the magnetic flux change. It is possible to provide a detection range larger than 90 degree. As a result, it can obtain the linear output with respect to the rotating angle in wider range, and it can improve the detection accuracy of the angular position.

In the first embodiment, since the arc-shaped depressions form the large gap portion 38, the magnetic flux can flow without a disturbance and is smoothly concentrated into the detecting portion 37. Therefore, the magnetic flux is effectively concentrated into the detecting portion 37. The other curved shape can provide the same advantage.

[Second Embodiment]

The shape of the permanent magnet is not limited to the ring shape, and several modifications, as shown in FIGS. 6–10, can be thought. A second embodiment of the present invention will be explained with reference to FIG. 6. Hereinafter, portions, which are substantially the same portions as those of the above-described embodiment, are put the same symbols to omit explanations. In the second embodiment, two arc-shaped permanent magnets 39 are disposed in the rotor core 24. A resin separates the permanent magnets 39. Each of the stator cores 25 has a circumferential length larger than an inner surface of the permanent magnet 39.

[Third Embodiment]

Figure 7:
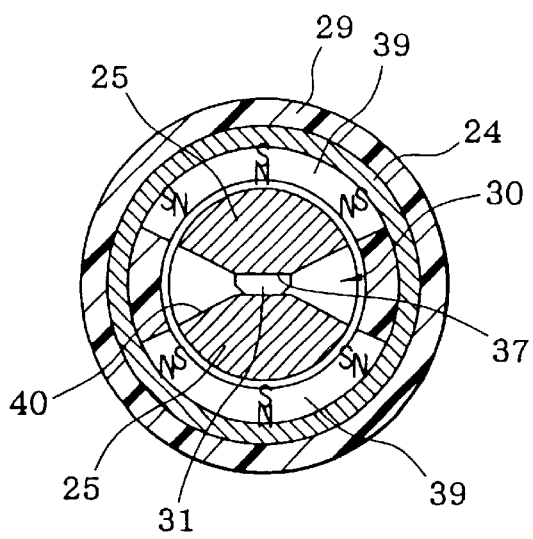

FIG. 7 shows a third embodiment of the present invention. In the third embodiment, large gaps 40 are formed on both sides of the detecting portion 37 by tapered surfaces. Each of the stator cores 25 has the same circumferential length as an inner surface of the permanent magnet 39.

[Fourth Embodiment]

Figure 8:
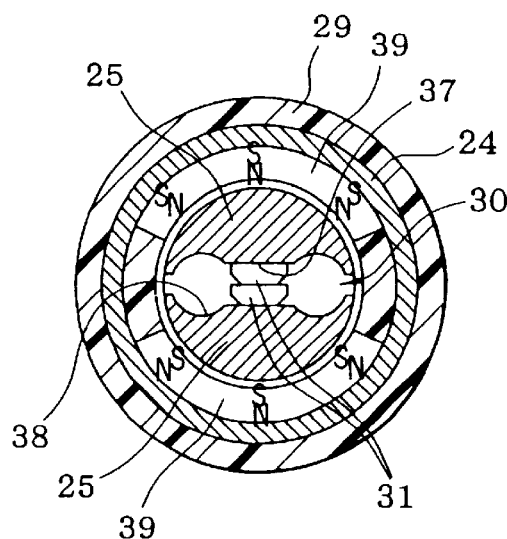

FIG. 8 shows a fourth embodiment of the present invention. In this embodiment, Hall ICs 31 and 31 having the same polarities are serially stacked in the detecting portion 37. The Hall ICs 31 can improve a reliability of the system, for example, output signals of the Hall ICs 31 may be used for detecting a malfunction by comparing the outputs each other, the output signals may be used for backing up each other.

[Fifth Embodiment]

Figure 9:
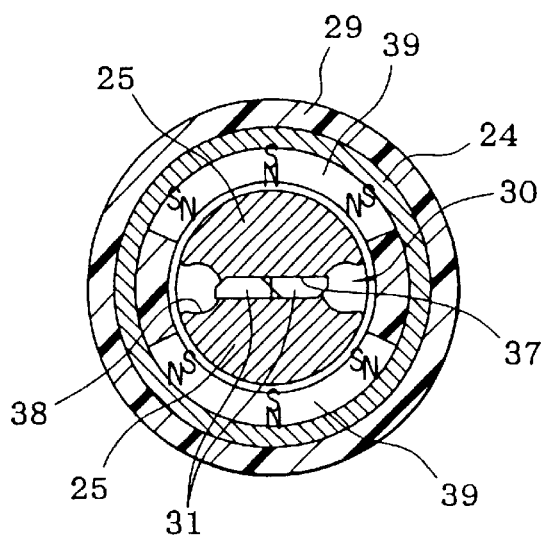

FIG. 9 shows a fifth embodiment of the present invention. In this embodiment, Hall ICs 31 and 31 having opposite polarities are put side by side. The large gap portions 38 are shifted outside. Therefore, the stator core 25 has large gap thereon. In this embodiment, the similar advantages as the fourth embodiment can be achieved.

[Sixth Embodiment]

Figure 10:
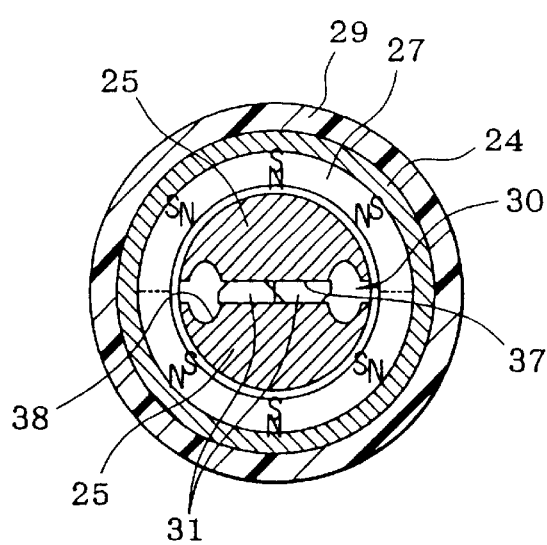

FIG. 10 shows a sixth embodiment of the present invention. In this embodiment, each of the large gap portions 38 is formed as an oval shape. Therefore, narrower gaps are provided on an outer surface of the stator core 25.

[Seventh Embodiment]

Next, a seventh embodiment of the present invention will be explained with reference to FIGS. 11 and 12. In the seventh embodiment, a rotating lever 41 for coupling with the detection object is formed by molding the rotor core 24 and the permanent magnet 27 using resin. A molded resin portion, which is an inner side of the rotor core 24 and the permanent magnet 27, of the rotating lever 41 is inserted and rotatably supported to an outer side of the stator core 42. Here, the molded resin portion, which is an inner side of the rotor core 24 and the permanent magnet 27, acts as a bearing (slidably movable portion) with respect to the stator core 42. The resin layered on the permanent magnet provides a magnetic gap G1 between the permanent magnet 27 and the stator core 42. The rotation lever 41 is pressed to a predetermined rotational direction by a twist coil spring 43, and is automatically returned to an initial position by a spring force. A through hole 44 is formed on a center of the rotating lever 41. A small diameter portion 45 formed on a left end of the stator core 42 is inserted into the hole 44. The rotating lever 41 is supported on the small diameter portion by a stopper plate 46, which is fixed on a tip portion of the small diameter portion 45 and prevents the rotation lever 41 from being removed. A spring washer 47 for restricting a movement of the rotation lever 41 in a thrust direction is sandwiched between the stopper plate 46 and the rotation lever 41. A distance of the gap portion G3 is set larger than that of the gap G2, and a distance of the gap portion G4 is set larger than that of the gap G1. In this embodiment, the same advantages as the first embodiment can be achieved.

[Eighth Embodiment]

Figure 13:
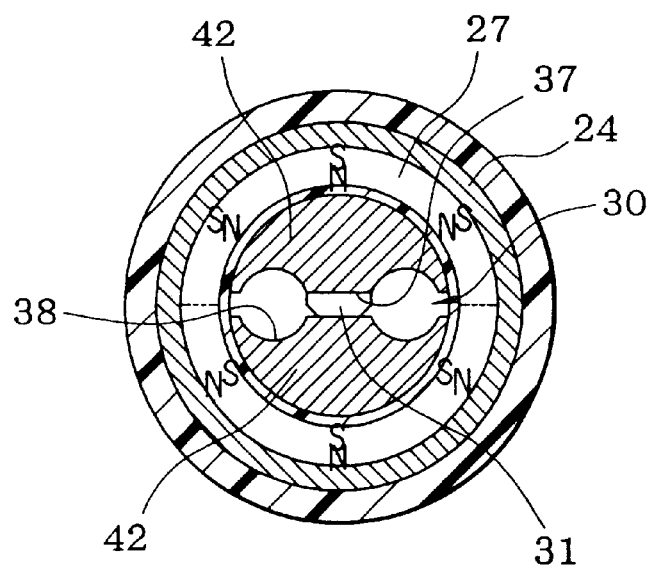
FIG. 13 is a sectional view of the eighth embodiment.

FIG. 13 shows an eighth embodiment of the present invention. In this embodiment, number of the Hall IC 31 is decreased from the seventh embodiment.

[Ninth Embodiment]

Figure 14:
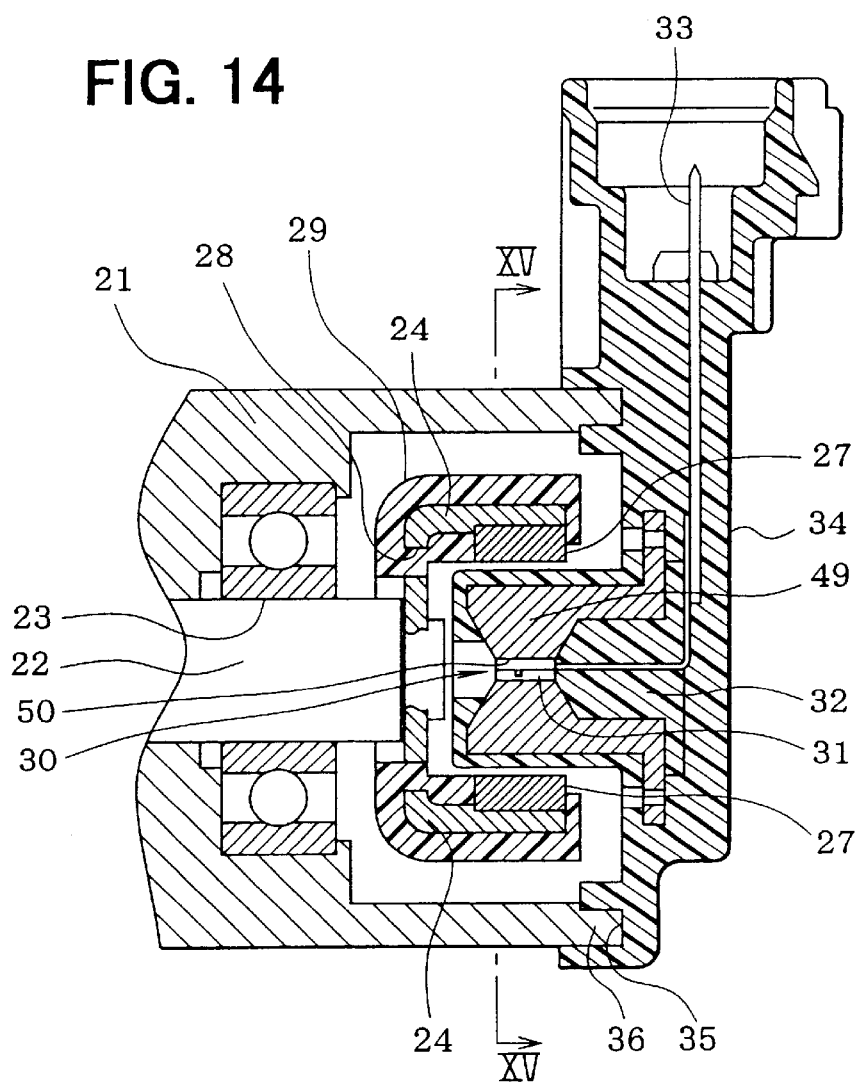
FIG. 14 is a vertical sectional view of an angular position detecting apparatus according to a ninth embodiment of the present invention.
Figure 15:
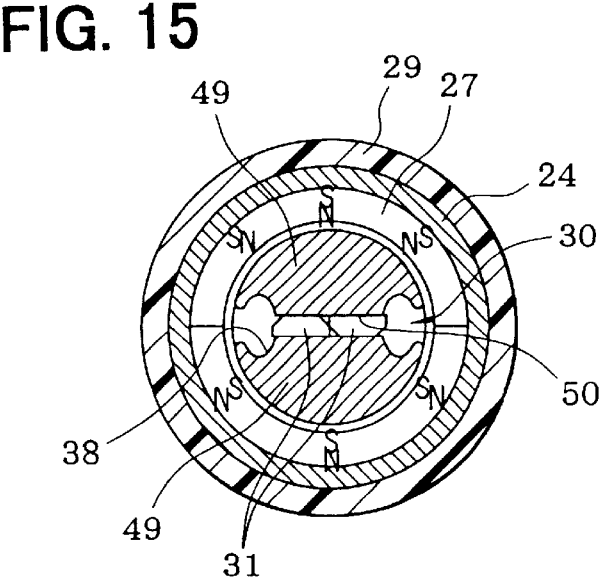
FIG. 15 is a sectional view of the ninth embodiment, taken along a line XV—XV in FIG. 14.

FIGS. 14 and 15 are shows a ninth embodiment of the present invention. As shown in FIG. 14, the stator core 49 has tapered grooves on both axial ends. The tapered grooves are formed parallel with the gap 50 extending in a diametric direction. The stator core 49 has an outer surface which has an axial length longer than an axial length of the permanent magnet 27 to provide a sufficient area to receive the magnetic flux from the permanent magnet 27. The permanent magnet 27 is positioned on a center of the outer surface of the stator core 49, and is positioned on a radial outside of the detecting portion 50. An axial length of the detecting portion 50 is the same as an axial length of the Hall IC 31. However, the axial length of the detecting portion 50 can be set shorter than that of the Hall IC 31, in this case, smaller surface of the detecting portion 50 is set on the Hall element disposed inside the Hall IC 31.

According to the above-described ninth embodiment, since the stator core 49 has tapered grooves on both ends, it is possible to enlarge the outer surface area of the stator core 49 and to concentrate more magnetic flux into the Hall IC 31. In the case that the outer surface of the stator core is enlarged, the stator core 49 stably receives the magnetic flux from the permanent magnet 27, even if a relative position between the permanent magnet 27 and the stator core 49 is shifted in an axial direction by an error of an assembling process or a vibration. Therefore, it is possible to prevent a change of the magnetic flux passing through the Hall element in the Hall IC 31 based on the assembling error or a vibration. As a result, it is possible to achieve a stable output performance even there is the assembling error or a vibration. It is possible to improve a detecting accuracy of the rotating angle based on the advantages provided by the large gap portion 38 and the tapered groove of the stator core 49. The tapered groove may be formed on at least one of the axial ends.

[Tenth Embodiment]

Figure 16:
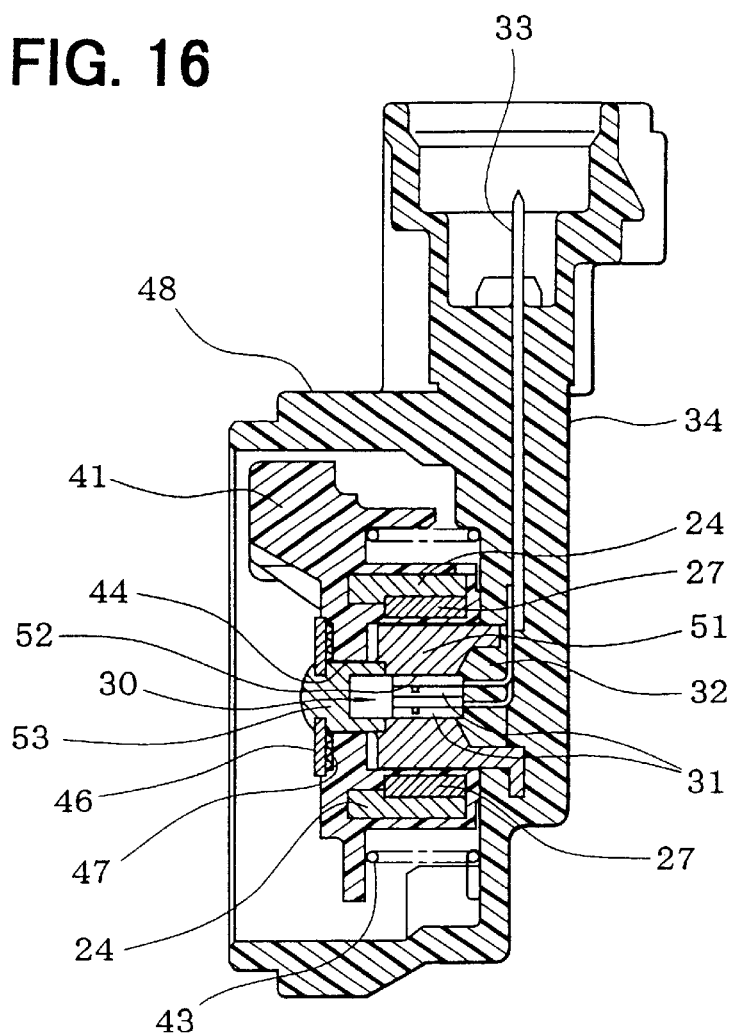
FIG. 16 is a vertical sectional view of an angular position detecting apparatus according to a tenth embodiment of the present invention.

FIG. 16 shows a tenth embodiment of the present invention. In this embodiment, a shaft 53 made of nonmagnetic material is supported on a center of a left side end of the stator core 51. The shaft 53 is inserted into the rotating lever 41. The stator core 51 has a tapered groove on a right side end. It is possible to achieve the same advantages as the ninth embodiment.

In the above-described ninth embodiment and tenth embodiment, the large gap portion 38 may be eliminated, because the tapered groove provides a concentration of the magnetic flux.

The above-described embodiments are called as a radial gap type apparatus, however the present invention may apply to an axial gap type apparatus which has a permanent magnet disposed opposite to a stator core in an axial direction. Further, the present invention may apply to a modified radial gap type apparatus which has a permanent magnet disposed opposite to a stator core in an axial direction and a rotor core having a portion elongated to face an outer surface of the stator core.

[Eleventh Embodiment]

Figure 17:
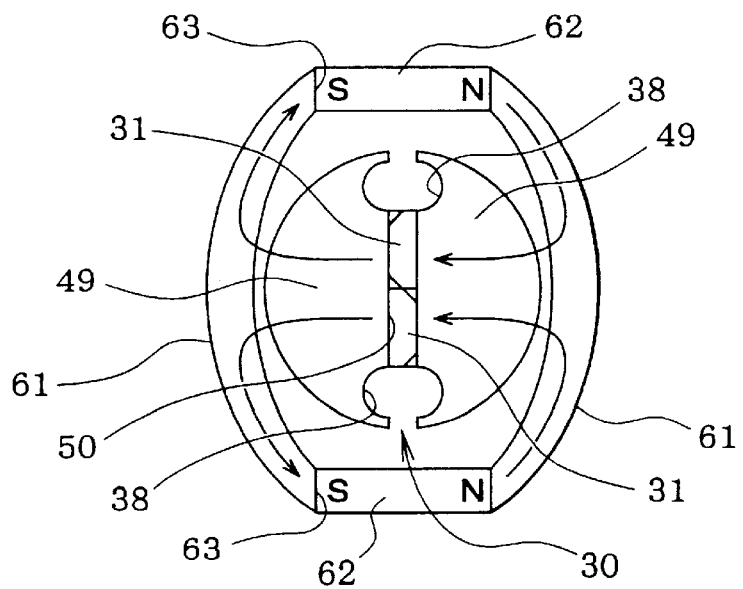
FIG. 17 is a sectional view of an 11th embodiment.
Figure 18:
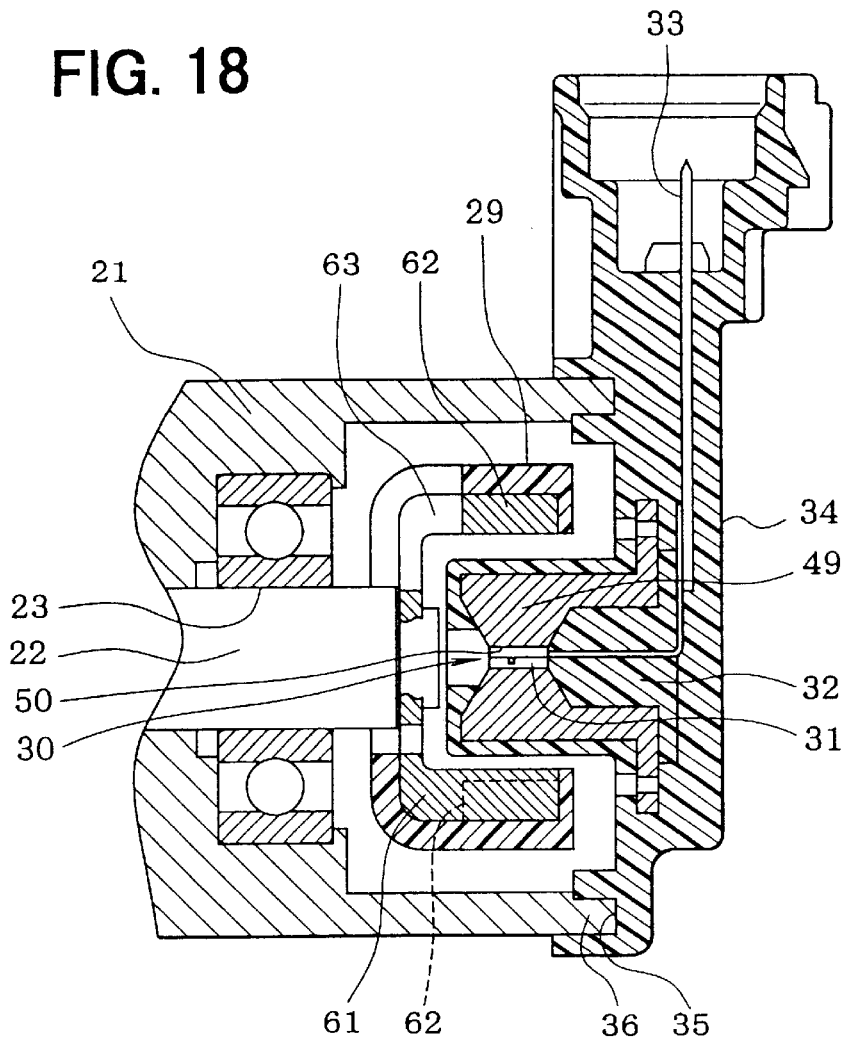
FIG. 18 is a vertical sectional view of an angular position detecting apparatus according to the 11th embodiment of the present invention.
Figure 19:
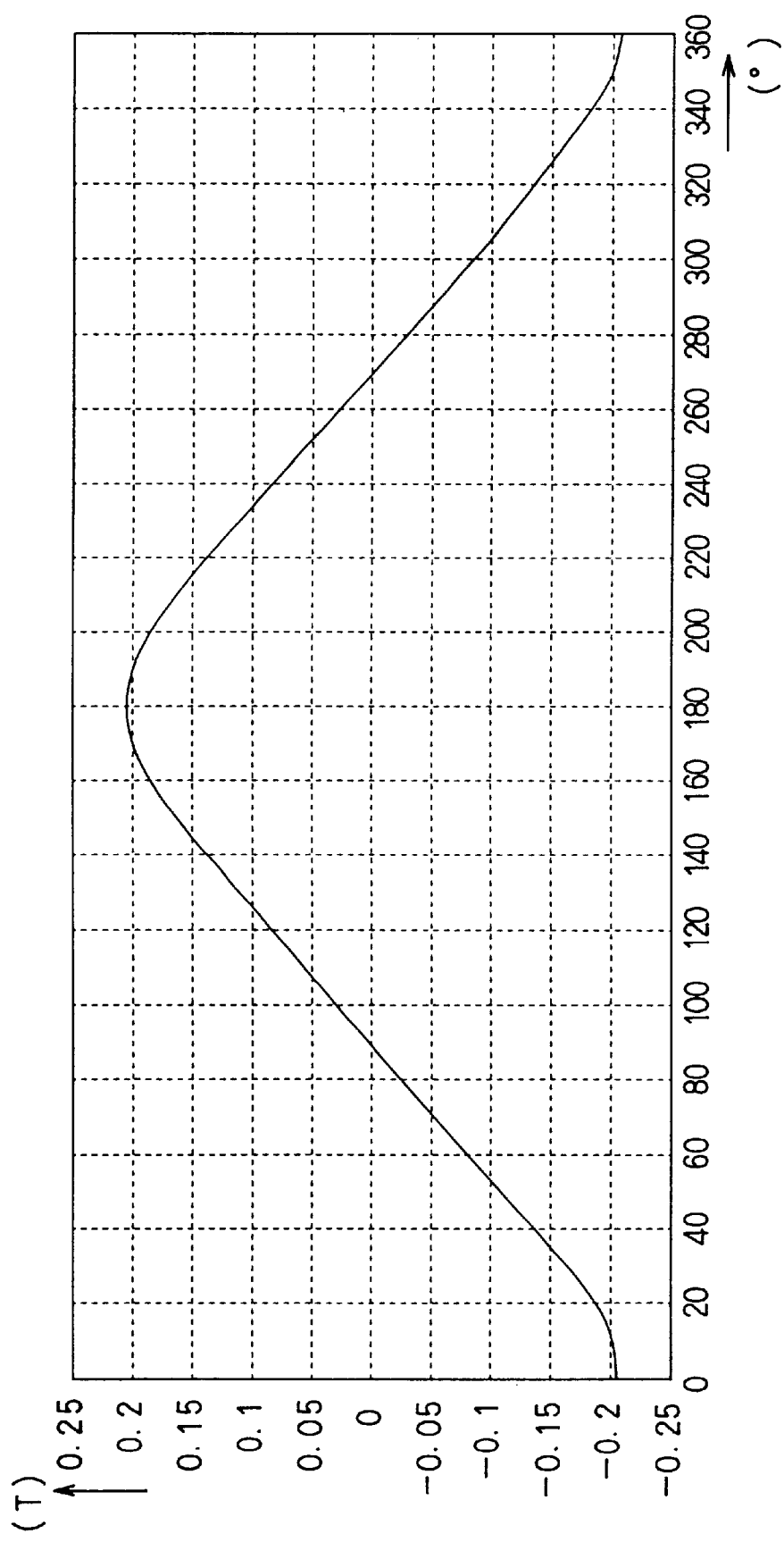
FIG. 19 is a graph showing a magnetic flux density at the detecting portion with respect to the rotating angle of the eleventh embodiment.

FIGS. 17–19 show an eleventh embodiment of the present invention. In this embodiment, the rotor arrangement is different from the above-described embodiments. A rotor core 61 is formed as a cylindrical shape having an ellipse or an oval cross section. Permanent magnets 62 are inserted into groove portions 63 formed on both longer diameter sides of the rotor core 61. Each of the permanent magnets 62 is magnetized in a direction parallel to a longitudinal direction.

In this embodiment, as shown in FIG. 17, the magnetic flux of the permanent magnets 62 from the N pole to the S pole runs through the following path: the rotor core 61 the stator core 49→the detecting portion 50 (the Hall IC 31) the stator core 49→the rotor core 61. When the rotor core 61→rotates as a rotation of the detection object such as the throttle valve, the magnetic flux density (the magnetic flux density passing through the Hall IC 31) passing through the detecting portion 50 of the stator core 49 varies as shown in FIG. 19 in accordance with the rotating angle of the detection object. Therefore, the Hall IC 31 outputs a signal according to the magnetic flux density. In this case, the rotor core 61 and the stator core 49 provide a gap which becomes wider as it close to the magnets 62. Therefore, in an inside of the rotor core 61, the gap (air gap) has wider portions for preventing a short circuit of the magnetic flux between both of the magnetic poles of each permanent magnets 62. The wider portions are located close to the permanent magnets 62. The gap between the rotor core 61 and the stator core 49 becomes narrower gradually as it is apart from the permanent magnets 62. Therefore, the magnetic flux flows to the stator core 49 is scattered and averaged by preventing a concentration of the magnetic flux from an inner surface of the rotor core 61 to an outer surface of the stator core 49 into a portion close to the permanent magnet 62. Therefore, the linearity of the varying characteristic with respect to the rotating angle of the magnetic flux in the detecting portion 50 is improved.

In this embodiment, since the rotor core 61 provides surfaces nearest to the stator core 49, the permanent magnets 62 are not required to have specific shapes for facing to the stator core 49 with narrow air gaps. Therefore, the permanent magnet 62 can be a simple shape which is easy to manufacture and easy to be magnetized. For instance, in this embodiment, the permanent magnet 62 is formed as a plate shape. The plate-shaped permanent magnet 62 can be manufactured by the easiest molding method and the easiest magnetizing method. Therefore, a less irregularity and a high quality permanent magnet 62 can be manufactured at low cost. As a result, it is possible to improve the detecting accuracy of the rotating angle and to suppress an error component of the output of the Hall IC 31 depending on the irregularity of the permanent magnet 62.. Moreover, the gap formed inside the rotor core 61 is wider at portions close to the permanent magnets 62 to prevent the short circuit of the magnetic flux. Therefore, it is possible to prevent a decreasing of the magnetic flux passing through the detecting portion 50 (the Hall IC 31) and to prevent a decreasing of the detecting accuracy.

[Twelfth Embodiment]

Figure 20:
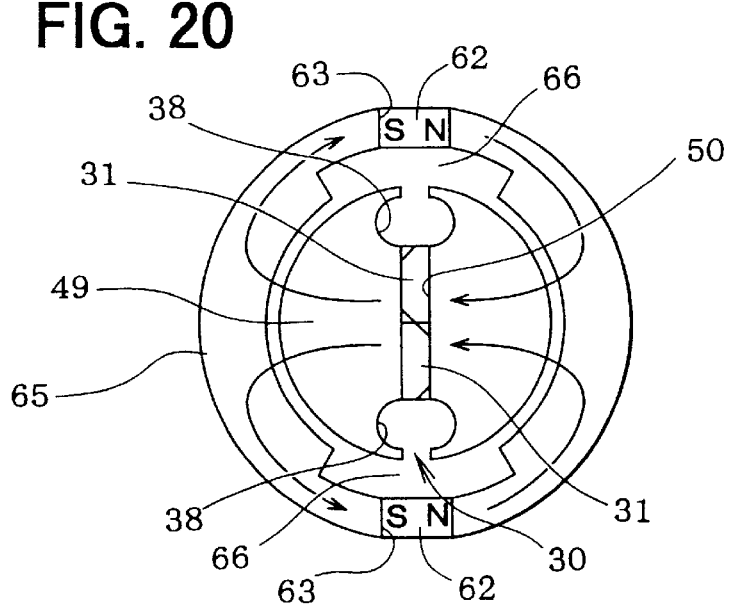
FIG. 20 is a sectional view of a twelfth embodiment.

FIG. 20 shows a twelfth embodiment of the present invention. The rotor core 65 has two thicker portions and four thinner portions on both sides of the thicker portions. The thinner portions have the same thickness as the plate-shaped permanent magnets 62. Therefore, the rotor formed by the permanent magnets 62 and the rotor core 65 provides two depressions as air gaps 66 to prevent a short circuit of the magnetic flux. The thicker portions of the rotor core 65 provide two narrower air gaps having constant distance between the rotor core 65 and the stator core 49. In this embodiment, the rotor core 65 can be manufactured easily.

[Thirteenth Embodiment]

Figure 21:
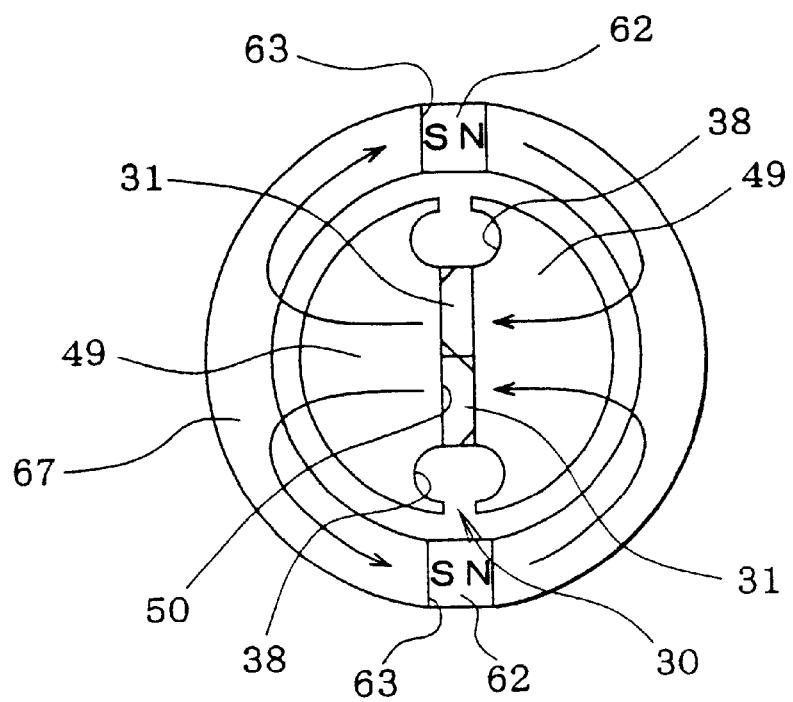
FIG. 21 is a sectional view of a thirteenth embodiment.
Figure 22:
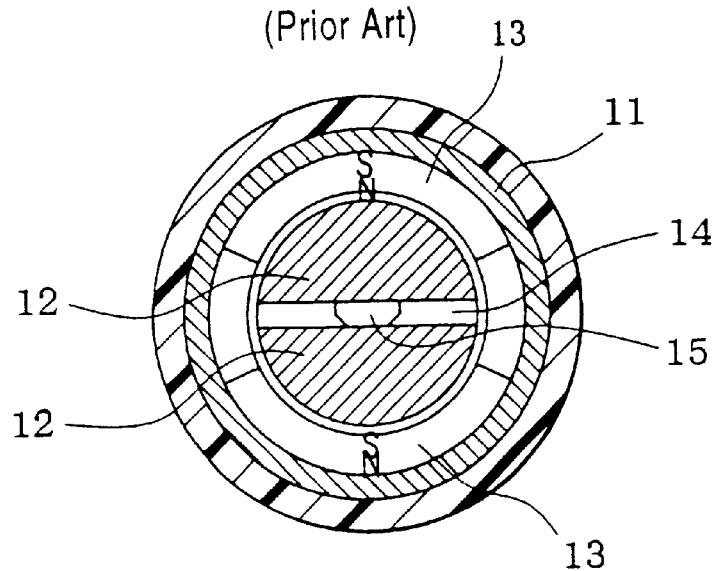
FIG. 22 is a sectional view of a prior work by the inventor.

FIG. 21 shows a thirteenth embodiment of the present invention. A rotor having a rotor core 67 and the permanent magnets 62 provides a gap having a constant distance between the rotor core 67 and the stator core 49. In this embodiment, the gap 30 and the large gap portions 38 act to prevent a short circuit of the magnetic flux. The large gap portions 38 formed on both sides of the detecting portion 50 of the stator core 49 acts as a means for concentrating the magnetic flux flowing through the stator core 49 into the detecting portion 50, and acts as a means for preventing a short circuit of the magnetic flux of the permanent magnet 62 too. As a result, in this embodiment, it is possible to detect the rotating angle by using a repelling magnetic field of two permanent magnets 62.

In the above-described 11th–13th embodiments, the arrangement of the permanent magnets on the rotor core may be changed to the other portion of the magnetic flux path of the rotor core. In this case, two permanent magnets must be located to be repelled the magnetic fields each other. Further, in the above-described 11th–13th embodiments, the permanent magnets 62 are arranged on two paths in which the magnetic flux flows, respectively. However, a plurality of permanent magnets may be located on one of the paths to increase the magnetic field so that the N pole and the S pole of the neighboring permanent magnets are opposed to each other. On the other hand, more than three magnets each having the magnetic fields repel each other may be located to provide more than three magnetic flux path. In this case, the Hall IC (detecting element) is located on a position in the paths where the magnetic flux flows in parallel. Further, the shape of the permanent magnets in the above-described 11th–13th embodiments is not limited in the plate shape. The permanent magnets can be modified into an appropriate shape that is easy to manufacture in accordance with a position where the permanent magnets is located or a space for accommodating the permanent magnets. The permanent magnets may have different dimensions each other.

Figure 11:
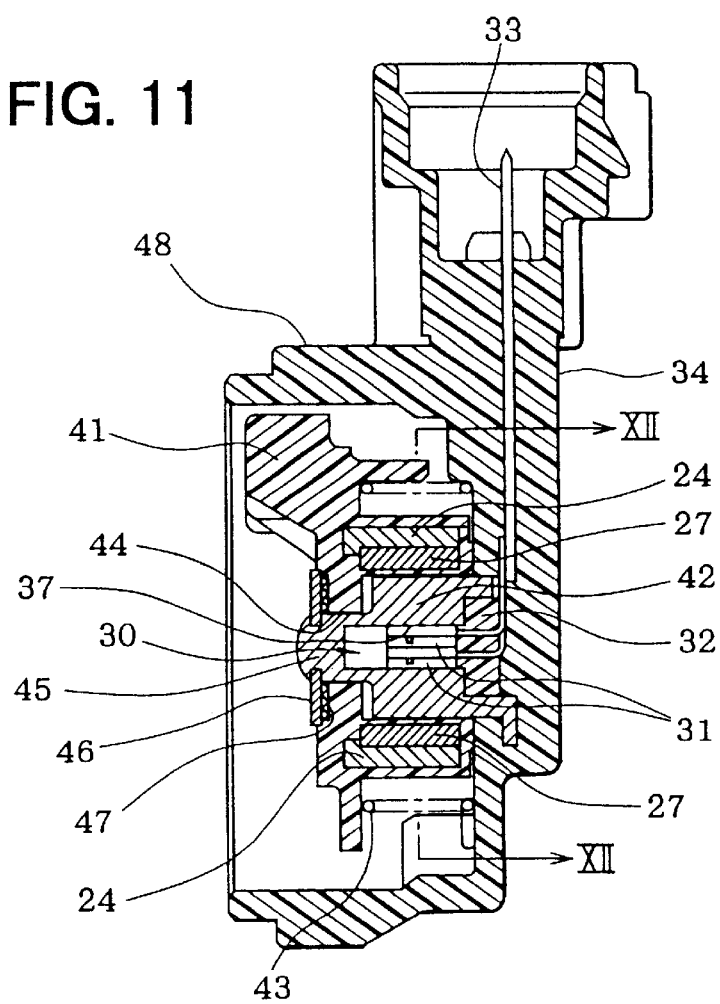
FIG. 11 is a vertical sectional view of an angular position detecting apparatus according to a seventh embodiment of the present invention.
Figure 12:
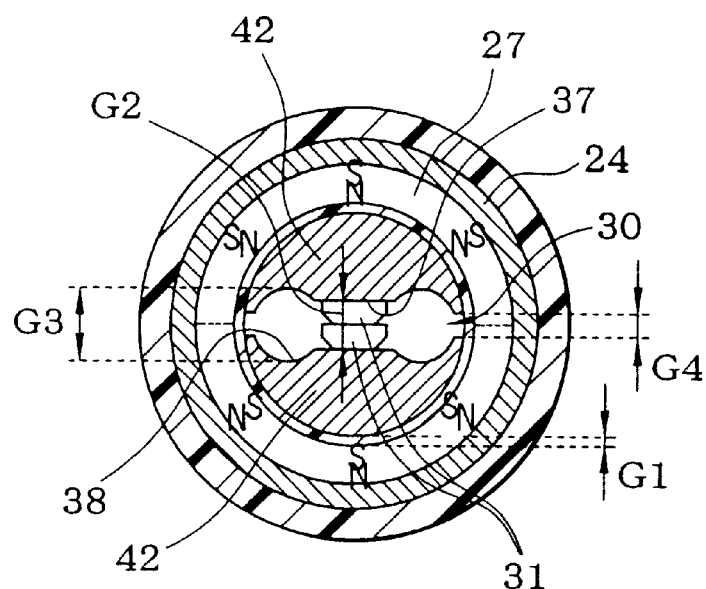
FIG. 12 is a sectional view of the seventh embodiment, taken along a line XII—XII in FIG. 11.

Further, the above-described 11th–13th embodiments provide a direct coupling with the rotating shaft 22 of the detection object and the rotor core, but the rotating lever molded with the rotor core may be adopted to couple with the detection object as shown in FIGS. 11 and 16.

In the above-described embodiment, the Hall IC 31 is used as the magnetism detecting element for detecting the magnetic flux in the detecting portion, but a magneto-resistance element or the like can be used instead of the Hall IC (Hall element). Further, the large gap portion may be disposed on only one side of the detecting portion. In this case, the detecting portion may be shifted to the other side. Additionally, the present invention is not limited to the angular position detecting apparatus for the throttle valve, is able to apply to an angular position detecting apparatus for various kinds of rotating member.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An angular position detecting apparatus comprising:
   a rotor for rotating in response to a rotation of a detection object, the rotor having a rotor core and a permanent magnet fixed to the rotor core;

a stator core concentrically arranged with respect to the rotor core, the stator core having a diametrical gap portion formed therein; and a detecting element being arranged in the gap portion, for outputting a signal in response to a magnetic flux density passing through the gap portion, wherein the gap portion has a detecting portion which includes a first small gap portion having a first, small gap distance and a pair of second, large gap portions, each having a second, large gap distance larger than the first gap distance, said large gap portions being disposed on diametrically opposite sides of said detecting portion for concentrating the magnetic flux into the detecting portion, and wherein the detecting element is located in the detecting portion.

2. An angular position detecting apparatus according to claim 1, wherein the detecting portion is located in a center of the stator core.

3. An angular position detecting apparatus according to claim 1, wherein the large gap portion is formed to decrease a distance of the gap at a radial outside of the stator core.

4. An angular position detecting apparatus according to claim 3, wherein the large gap portion provides a distance at a radial outside of the stator core, which is wider than a distance between the rotor and the stator core.

5. An angular position detecting apparatus according to claim 1, wherein the large gap portion is defined by a curved surface of the stator core.

6. An angular position detecting apparatus according to claim 1, wherein the stator core is formed to have an axial length that decreases from a radially outer surface of the stator toward the detecting portion.

7. An angular position detecting apparatus according to claim 1, wherein the permanent magnet comprises a plurality of permanent magnets having magnetic poles disposed to oppose each other.

8. An angular position detecting apparatus according to claim 7, further comprising gap portions defined close to the permanent magnets for preventing a short circuit of the magnetic flux between both of the magnetic poles of the permanent magnets and the stator core.

9. An angular position detecting apparatus according to claim 1, wherein:

the rotor core is arranged radially outside the stator core, the rotor core is cylindrically formed to have an oval cross section, first and second permanent magnets are provided at both sides in a longitudinal direction of the rotor core, respectively, a gap between the rotor core and the stator core becomes larger in a vicinity of the first and second permanent magnets, and the first and second permanent magnets are magnetized such that magnetic fields generated by the first and second permanent magnets repulse each other with the rotor core.

10. An angular position detecting apparatus, comprising:

a permanent magnet;

a rotor for modulating a direction of a magnetic flux generated by the permanent magnet in response to a rotation of a detection object;

a stator disposed on a path of the magnetic flux modulated by the rotor; and a detecting element for detecting the magnetic flux passing through the stator core, wherein the stator core defines a diametrical gap portion therein for providing a detecting portion where the detecting element is located, and the stator core further defines a pair of guide portions, one on each diametrically opposite side of said detecting portion, for concentrating the magnetic flux passing through the stator core into the detecting portion.

11. An angular position detecting apparatus according to claim 10, wherein the guide portions define a gap distance wider than a gap distance of the detecting portion.

12. An angular position detecting apparatus according to claim 11, wherein the distance provided by the guide portion is decreased toward the detecting portion.

13. An angular position detecting apparatus comprising:

a rotor for rotating in response to a rotation of a detection object, the rotor having a rotor core and a permanent magnet fixed to the rotor core;

a stator core concentrically arranged with respect to the rotor core, the stator core having a gap portion; and a detecting element for outputting a signal in response to a magnetic flux density passing through the gap portion, wherein the gap portion has a detecting portion into which the detecting element is installed, and wherein the stator core is formed to have an axial length that decreases from a radial outer surface of said stator core toward the detecting portion.

14. An angular position detecting apparatus according to claim 13, wherein the permanent magnet comprises a plurality of permanent magnets having magnetic poles disposed to oppose each other.

15. An angular position detecting apparatus according to claim 14, further comprising gap portions defined close to the permanent magnets for preventing a short circuit of the magnetic flux between both of the magnetic poles of the permanent magnets and the stator core.

16. An angular position detecting apparatus comprising:

a rotor for rotating in response to a rotation of a detection object, the rotor having a rotor core and a permanent magnet fixed to the rotor core;

a stator core concentrically arranged with respect to the rotor core, the stator core having a gap portion formed therein; and a detecting element being arranged in the gap portion, for outputting a signal in response to a magnetic flux density passing through the gap portion, wherein the gap portion has a detecting portion which includes a first small gap portion having a first, small gap distance and second, large gap portions having a second, large gap distance larger than the first gap distance for concentrating the magnetic flux into the detecting portion, the detecting element is located in the detecting portion, the rotor core is arranged radially outside the stator core, the rotor core is cylindrically formed to have an elliptical cross section having a major axis and a minor axis which is each perpendicular to a longitudinal axis therein, first and second permanent magnets are provided on the major axis of the rotor core, at respectively opposite sides of the stator, a gap between the rotor core and the stator core becomes larger in a vicinity of the first and second permanent magnets, and the first and second permanent magnets are magnetized such that magnetic fields generated by the first and second permanent magnets repulse each other within the rotor core.

17. An angular position detecting apparatus according to claim 16, wherein the detecting portion is located in a center of the stator core, and wherein a said large gap portion is located on both sides of the detecting portion.

18. An angular position detecting apparatus according to claim 16, wherein the large gap portion is formed to decrease a distance of the gap at a radial outside of the stator core.

19. An angular position detecting apparatus according to claim 16, wherein said first and second permanent magnets are each formed as a plate shape.

* * * * *